United States Patent
Lindsay et al.

(10) Patent No.: US 9,497,154 B2
(45) Date of Patent: Nov. 15, 2016

(54) MEASURING SOCIAL NETWORK-BASED INTERACTION WITH WEB CONTENT EXTERNAL TO A SOCIAL NETWORKING SYSTEM

(75) Inventors: Robert Taaffe Lindsay, San Francisco, CA (US); Alex Himel, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 656 days.

(21) Appl. No.: 12/967,022

(22) Filed: Dec. 13, 2010

(65) Prior Publication Data

US 2012/0151322 A1 Jun. 14, 2012

(51) Int. Cl.
G06F 17/00 (2006.01)
H04L 12/58 (2006.01)
G06F 17/22 (2006.01)
G06Q 50/00 (2012.01)

(52) U.S. Cl.
CPC ........... *H04L 51/32* (2013.01); *G06F 17/2235* (2013.01); *G06Q 50/01* (2013.01)

(58) Field of Classification Search
CPC ........... G06F 17/2247; G06F 17/2235; G06F 17/30873; G06F 17/30828
USPC ........................ 715/201, 206, 234; 705/14.41
See application file for complete search history.

(56) References Cited

U.S. PATENT DOCUMENTS

| | | | |
|---|---|---|---|
| 2006/0021009 A1* | 1/2006 | Lunt | H04L 12/585 726/4 |
| 2006/0247940 A1* | 11/2006 | Zhu et al. | 705/1 |
| 2006/0277087 A1* | 12/2006 | Error | 705/8 |
| 2007/0027761 A1* | 2/2007 | Collins et al. | 705/14 |
| 2007/0168216 A1* | 7/2007 | Lemelson | 705/1 |
| 2008/0040475 A1* | 2/2008 | Bosworth et al. | 709/224 |
| 2008/0183745 A1* | 7/2008 | Cancel et al. | 707/102 |
| 2008/0189169 A1* | 8/2008 | Turpin et al. | 705/10 |
| 2008/0195657 A1* | 8/2008 | Naaman et al. | 707/104.1 |
| 2008/0222199 A1* | 9/2008 | Tiu et al. | 707/104.1 |
| 2008/0249966 A1* | 10/2008 | Luege Mateos | 706/11 |
| 2008/0256233 A1* | 10/2008 | Hall et al. | 709/224 |

(Continued)

OTHER PUBLICATIONS

Jessica Lee, Facebook Makes it Easier to Creat and Share Events, Jul. 9, 2009, Inside Facebook, pp. 1-3 Retrieved:http://www.insidefacebook.com/2009/07/09/facebook-makes-it-easier-to-create-and-share-events/.*

(Continued)

*Primary Examiner* — Scott Baderman
*Assistant Examiner* — Howard Cortes
(74) *Attorney, Agent, or Firm* — Fenwick & West LLP (57) ABSTRACT

A social networking system includes a mechanism for generating nodes in the social graph corresponding to web content external to the social networking system. These nodes allow the social networking system to track user interactions within the social networking system about web content external to the social networking system. The web content markup language document(s) include one or more tags, which contain information for defining the node in the social networking system. Users may then interact with the node, and these interactions are tracked by the social networking system. From this, the social networking system generates analytics, which include historical data and user demographic and behavioral information, and which can be provided to the web content provider via the social networking system. A user interface within the social networking system can be used to provide access to the analytics.

17 Claims, 7 Drawing Sheets

(56) References Cited

U.S. PATENT DOCUMENTS

| | | | |
|---|---|---|---|
| 2008/0275899 A1* | 11/2008 | Baluja et al. | 707/102 |
| 2008/0288596 A1* | 11/2008 | Smith | G06Q 30/02 709/206 |
| 2009/0063284 A1* | 3/2009 | Turpin et al. | 705/14 |
| 2009/0112701 A1* | 4/2009 | Turpin et al. | 705/10 |
| 2009/0144392 A1* | 6/2009 | Wang et al. | 709/217 |
| 2009/0187486 A1* | 7/2009 | Lefenfeld et al. | 705/14 |
| 2009/0248661 A1* | 10/2009 | Bilenko et al. | 707/5 |
| 2009/0282052 A1* | 11/2009 | Evans et al. | 707/10 |
| 2010/0161662 A1* | 6/2010 | Jonas | G06F 17/30539 707/780 |
| 2010/0205254 A1* | 8/2010 | Ham | 709/206 |
| 2010/0217645 A1* | 8/2010 | Jin et al. | 705/9 |
| 2010/0223212 A1* | 9/2010 | Manolescu et al. | 706/12 |
| 2010/0257028 A1* | 10/2010 | Hillerbrand | 705/10 |
| 2010/0306834 A1* | 12/2010 | Grandison | G06F 21/6245 726/7 |
| 2010/0318611 A1* | 12/2010 | Curtin et al. | 709/206 |
| 2011/0251895 A1* | 10/2011 | Bladel | 705/14.54 |
| 2012/0023390 A1* | 1/2012 | Howes et al. | 715/205 |
| 2012/0109737 A1* | 5/2012 | Setty | G06Q 50/01 705/14.41 |
| 2012/0210247 A1* | 8/2012 | Khouri | G06Q 10/101 715/751 |

OTHER PUBLICATIONS

Matt Kinsey, Extending Facebook Share, Oct. 26, 2009, Facebook Developers, p. 1 Retrieved:https://developers.facebook.com/blog/post/2009/10/26/extending-facebook-share/.*

Wix, 5 Ways to Share Your Site on Facebook, Jul. 18, 2010, Wix, pp. 1-2 Retrieved:http://www.wix.com/blog/2010/07/5-ways-to-share-your-site-on-facebook/.*

Jolie Odell, Facebook Launches Live Counts & Stats for Sharing Widget, Oct. 26, 2009, pp. 1-2 Retrieved:http://readwrite.com/2009/10/26/facebook_launches_live_counts_for_sharing_widget/.*

Nick O'Neill, Facebook Makes Link Data Public With Share Analytics, Oct. 26, 2009, pp. 1-2 Retrieved:http://www.adweek.com/socialtimes/facebook-goes-after-bitly-and-others-with-share-analytics/311503.*

* cited by examiner

MEASURING SOCIAL NETWORK-BASED INTERACTION WITH WEB CONTENT EXTERNAL TO A SOCIAL NETWORKING SYSTEM

BACKGROUND

This invention relates generally to social networking, and in particular to measuring interaction within a social networking environment with web content external to the social networking system.

Social networking systems have become prevalent in recent years because they provide a useful environment in which users can connect to and communicate with other users. Although a variety of different types of social networking systems exist, these systems commonly provide mechanisms allowing users to define and interact within their social networks. In this context, a user may be an individual or any other entity, such as a business or other non-person entity. Accordingly, while enabling social communications among friends, a social networking system can also be a valuable tool for businesses to engage with potential consumers. Even without a commercial purpose, a social networking system may allow other types of entities to spread their message. For example, a non-person entity may set up a page or group that other users can join (or become a "fan" of), which enables the non-person entity to provide a forum to receive and transmit communications to a group of interested users.

Providers of web content external to a social networking system often want to gather demographics and other information about consumers of their products or web content, such as a website or individual web pages. However, such information typically is fairly limited, based on information provided by the consumer directly, and/or compiled by independent web analytics providers. Web content providers have not yet been able to exploit the relationships and connections among members of a social networking website in a meaningful way. The reason is that such web content typically is not readily tied to users of the social networking system. For example, if it were desirable to track whether users within the social networking system interacted with web content external to the social networking system, the information necessary to track the web content would have to be provided to the social networking system.

SUMMARY

To enable a social networking system to track socially relevant information about users within a social networking environment and their interactions with web content external to a social networking system, embodiments of the invention provide a flexible mechanism for incorporating nodes in the social graph for the external web content. In particular, embodiments of the invention enable a node to be defined by a web page or domain, which may be external to the domain of the social networking system.

In one embodiment, a node is generated in a social networking system, corresponding to web content external to the social networking system. Web page(s) encoded by a markup language document, which a web browser application can use to render and display the web page on a user device, include one or more tags that contain information for associating the web content with the node. The social networking system retrieves the tag(s) from the markup language document and stores their information in connection with the node for the content. In this way, a node in the social networking system may be created and defined based on the web content. This effectively opens the social graph to web content providers as users of the social networking system and allows them to measure the actions of users within the social networking system that is related to the web content.

In use, in one embodiment, a web content provider, who is a user of the social networking system, requests to associate a node in the social networking system with the web content, which may be a web page or a domain including multiple web pages. The content owner incorporates a tag into markup language document(s) for the web content identifying the web content as associated with the user in the context of the social networking system. Using the tag(s), the social networking system 130 generates a node associated with the web content, which is included in the social graph maintained by the social networking system, and allows one or more users access to the content based on the node configuration. User actions within with the social networking system are logged, and thus even previous user actions related to the web content are associated with the node.

Users of the social networking system interact with the node, e.g., via actions related to the web content. Such actions may include viewing the content, sharing the content (or re-sharing previously shared content), commenting on the content, "liking" the content, etc. The social networking system tracks the actions between users and the node. From the tracked interactions, the social networking system generates analytics, which can be provided to the user associated with the web content via the social networking system. The analytics can include demographic and behavioral data pertaining to the users, since this information also is logged by the social networking system. In addition, historical data for interactions between users and the web content can be provided, since data pertaining to the node was logged by the social networking system even before the web content was associated with the node. A user interface within the social networking system, with access limited to the content user associated with the web content, can be used to display the analytics.

Accordingly, embodiments of the invention allow measuring interactions within a social networking environment with web content external to the social networking system. This functionality allows for user interactions with a node that represents web content to be accessible by the user associated with the web content, which may then use the resulting socially relevant information for various purposes (e.g., targeting advertising, etc.).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1:
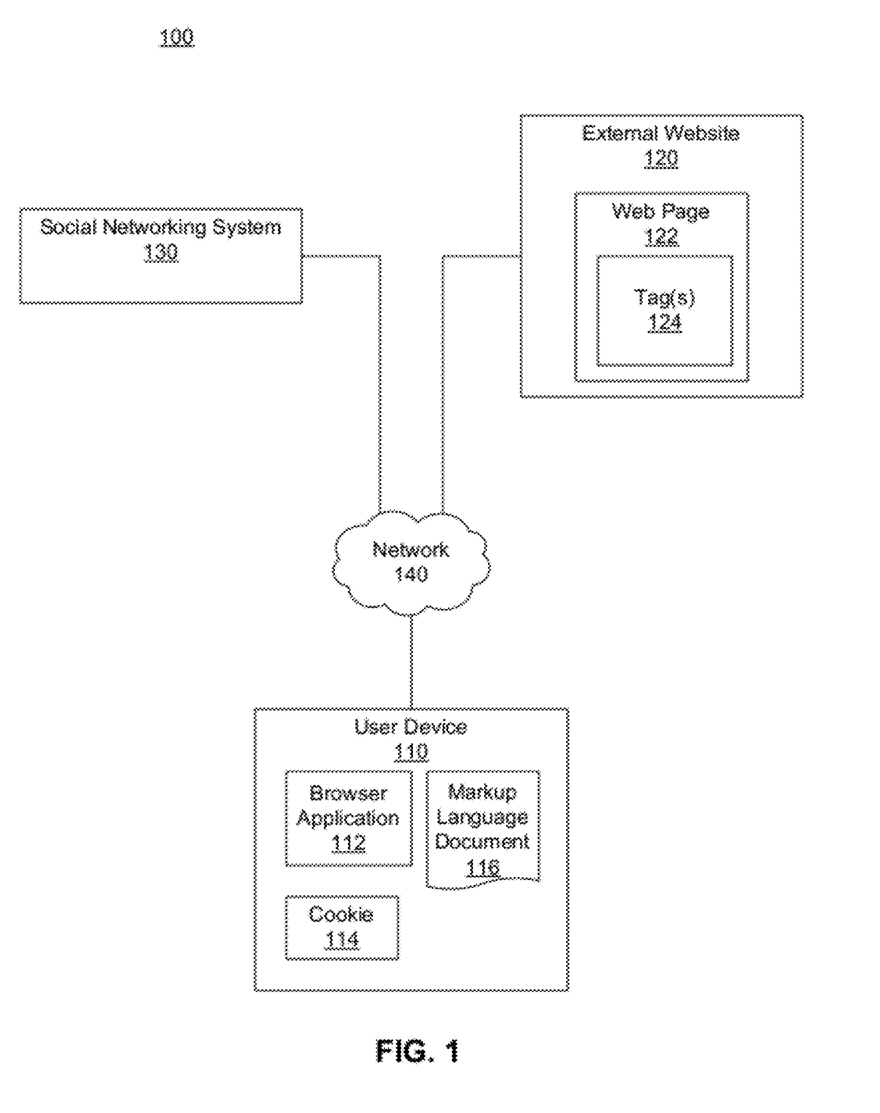
FIG. 1 is a network diagram of one embodiment of a system for tracking actions by users within a social networking system related to content external to the of a social networking system.

FIG. 1 is a network diagram of one embodiment of a system 100 for tracking actions by users within a social networking system 130 related to content external to the of a social networking system 130. The system 100 includes one or more user devices 110, one or more external websites 120, the social networking system 130 and a website 140. For purposes of illustration, the embodiment of the system 100 shown by FIG. 1 includes a single external website 120 and a single user device 110. However, in other embodiments, the system 100 may include more user devices 110 and/or more external websites 120. In certain embodiments, the social networking system 130 is operated by the social network provider, whereas the external websites 120 are separate from the social networking system 130 in that they may be operated by different entities. In various embodiments, however, the social networking system 130 and the external websites 120 operate in conjunction to provide social networking services to users of the social networking system 130. In this sense, the social networking system 130 provides a platform, or backbone, which other systems, such as external websites 120, may use to provide social networking services and functionalities to users across the Internet.

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the external website 120 and the social networking system 130 via the network 140, which may comprise any combination of local area and/or wide area networks, using both wired and wireless communication systems.

In one embodiment, the user device 110 displays content from the external website 120 or from the social networking system 130 by processing a markup language document 116 received from the external website 120 or from the social networking system 130 using a browser application 120. The markup language document 116 identifies content and one or more instructions describing formatting or presentation of the content. By executing the instructions included in the markup language document 116, the browser application 112 displays the identified content using the format or presentation described by the markup language document 116. In various embodiments, the markup language document 116 comprises a data file including extensible markup language (XML) data, extensible hypertext markup language (XHTML) data or other markup language data.

In one embodiment, the user device 110 also includes a cookie 114 including data indicating whether a user of the user device 110 is logged into the social networking system 130. The cookie 114 indicates whether the user of the computing device 110 is involved in an active session where the user device 110 exchanges data with the social networking system 130, allowing modification of the data communicated from the social networking system 130 to the user device 110.

The external website 120 comprises one or more web servers including one or more web pages 122, which are communicated to the user device 110 using the network 140. The external website 120 is separate from the social networking system 130. For example, the external website 120 is associated with a first domain while the social networking website is associated with a separate social networking domain. A web page 122 included in the external website 120 comprises a markup language document identifying content and including instructions specifying formatting or presentation of the identified content, as described above.

The markup language document 116 includes one or more tags including meta-information associating the web page 122 represented by the markup language document 116 with a node in the social networking system 130, which are further described below. The tags may provide textual titles, labels, and/or descriptions about the node in the social networking system 130, as well as other information, such as a title, label, unique identifier, micro format, and/or descriptions about the node, as well as other information, such as the type of the node. The tags allow creation of a node in the social networking system 116 based on the information within the markup language document 116 comprising a web page 122. As the web page 122 may be maintained by an external website 120 that is outside of the domain of the social networking system 130 and may be operated by an entity other than an operator of the social networking system 130, the tags in the markup language document 116 allow external websites 120 to define, create, and maintain nodes used by the social networking system 130, as further described below.

The social networking system 130 comprises one or more computing devices storing a social network, or a social graph, comprising a plurality of users and providing users of the social network with the ability to communicate and interact with other users of the social network. The social graph includes a plurality of nodes that are interconnected by a plurality of edges. Each node in the social graph may represent something that can act on and/or be acted upon by another node. Common examples of nodes include users, non-person entities, content items, groups, events, messages, concepts, and any other things that can be represented by an object in a social networking system. An edge between two nodes in the social graph represents a particular kind of connection between the two nodes, which may result from an action that was performed by one of the nodes on the other node. The social networking system 130 is further described below in conjunction with FIG. 2.

In use, users join the social networking system 130 and then add connections to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Once a user establishes a connection with another user in the social networking system, the two users are represented as nodes, and the edge between them represents the established connection. Continuing this example, one of these users may send a message to the other user within the social networking system. This act of sending the message is another edge between those two nodes, which can be tracked by the social networking system. Using a social graph, therefore, a social networking system may keep track of many different types of objects and the interactions and connections among those objects, thereby maintaining an extremely rich store of socially relevant information.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system.

These are just a few examples of the items upon which a user may act on a social networking system, and many others are possible. A user may interact with anything that is capable of being represented in the social networking system 130 or in an external website 120, separate from the social networking system 130, coupled to the social networking system 130 via a network 140.

The social networking system 130 is also capable of linking a variety of entities. For example, the social networking system 130 enables users to interact with each other as well as external websites 120 or other entities through an API or other communication channels. Providers of web content external to a social networking system often want to gather demographics and other information about consumers of their products or web content. If it is desirable to track whether users within the social networking system interacted with web content external to the social networking system, the web content can be associated with the social networking system as a node. Thus, the social networking system 130 generates and maintains the social graph comprising a plurality of nodes interconnected by a plurality of edges. Each node in the social graph may represent an entity that can act on another node and/or that can be acted on by another node. As various nodes interact with each other, the social networking system 130 modifies edges connecting the various nodes to reflect the interactions.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 100. Posts may include data such as status updates or other textual data, location information, photos, videos, links, music or other similar data and/or media. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact with the social networking system 130.

Figure 2:
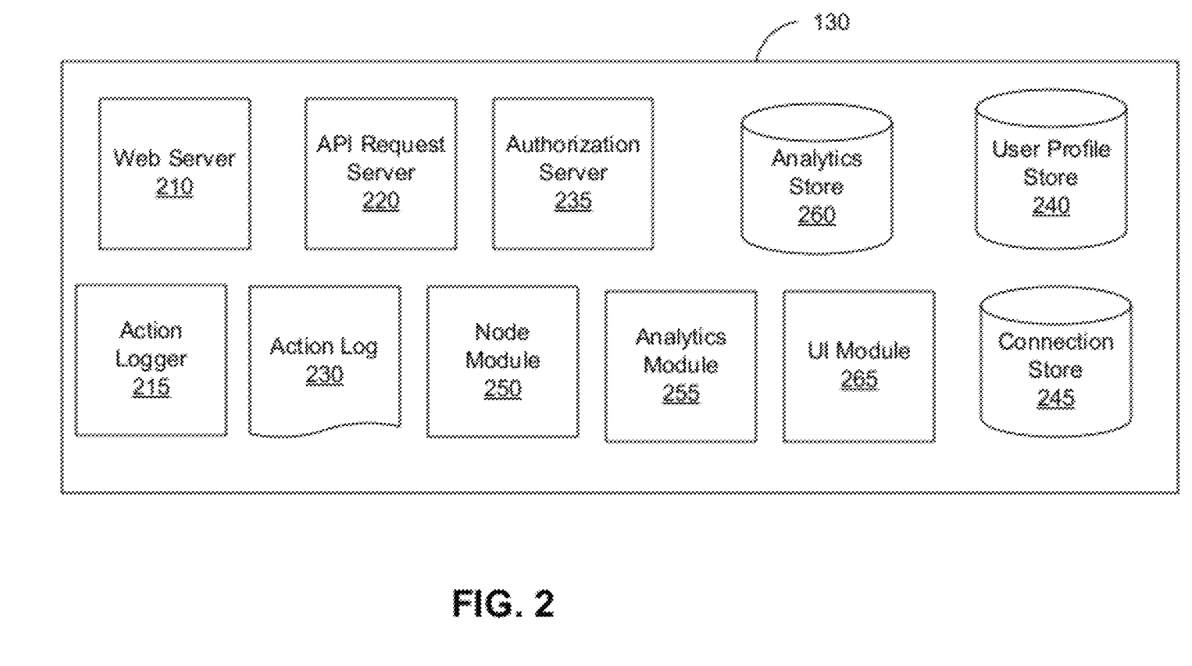
FIG. 2 is a diagram of a social networking system, in accordance with an embodiment of the invention.

FIG. 2 is a diagram of one embodiment of a social networking system 130. The embodiment of a social networking website 130 shown by FIG. 2 includes a web server 210, an action logger 215, an API request server 220, an action log 230, a user profile store 240, a connection store 245, a node nodule 250, an analytics module 255, and analytics store 260, and a user interface module 265. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network in a user profile store 240. The user profiles include biographic, demographic, and other types of descriptive information, such as work experience, educational history, hobbies or preferences, interests, location, and the like. For example, the user profile store 240 contains data structures with fields suitable for describing a user's profile. When a new object of a particular type is created, the social networking system 130 initializes a new data structure, i.e., a "node" of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

In addition, the user profile store 240 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc. In addition, the user profile store 240 may be accessed by other aspects of the social networking system 130.

The social networking system 130 further stores data describing one or more connections between different users in a user connection store 245. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 245 includes data structures suitable for describing a user's connections to other users, connections to external websites 120 or connections to other entities. The connection stores 245 may also associate a connection type with a user's connections, which may be used in conjunction with the user's privacy setting, to regulate access to information about the user. In addition, the connection store 245 may be accessed by other aspects of the social networking system 130.

The web server 210 links the social networking system to one or more user devices 110 and/or one or more external websites 130 via the network 140. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The Application Programming Interface (API) request server 220 allows one or more external websites 120 to access information from the social networking system 130 by calling one or more APIs. The API request server 220 also may allow external websites 120 to send information to social networking website by calling APIs. For example, a external website 120 sends an API request to the social networking system 130 via the network 140 and the API request server 220 receives the API request. The API request server 220 processes the request by calling an API associated with the API request to generate an appropriate response, which the API request server 220 communicates to the external website 120 via the network 140. For example, responsive to an API request, the API request server 220 collects data associated with a user and communicates the collected data to the external website 120. The data communicated includes analytics corresponding to user interactions with web content according to one embodiment.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in an action log 230. In one embodiment, the social networking system maintains the action log 230 as a database of entries. When an action is taken within the social networking system 130, an entry for the action is added to the action log 230.

Additionally, user actions may be associated with an entity outside of the core social networking system 130, such as a external website 120 that is separate from the social networking system website 130. For example, the action logger 215 receives data describing a user's interaction with a third party website 120 from the web server 210. Examples of actions where a user interacts with a external website 120 includes a user expressing an interest in a external website 120 or another entity, a user posting a comment to the social networking system 130 that discusses a external website 120, or a web page 122 within the external website 120, a user posting to the social networking system 130 a Uniform Resource Locator (URL) or other identifier associated with a external website 120, a user attending an event associated with a external website 120 or any other action by a user that is related to a external website 120. Thus, the action log 230 may include actions describing interactions between a social networking system user and a external website 120 that is separate from the social networking system 130.

The action log 230 maintains a record of all edges between nodes of the system. In the case in which external website 120 content becomes associated with a node in the social networking system 130, the action log tracks information about the edges associated with user actions. In addition, the action log 230 can re-associate web content not originally associated with a node such that it is associated with a node, allowing historical data for the node to be captured.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites 120 or any entity that can potentially access the information. The information that can be shared by a user comprises user profile information like profile photo, phone numbers associated with the user, user's connections, actions taken by the user such as adding a connection, changing user profile information and the like.

The useful social information that is tracked and maintained by a social networking system can be thought of in terms of a "social graph," which includes a plurality of nodes that are interconnected by a plurality of edges. The node module 250 contains logic for generating nodes associated with web content external to the social networking system 130, e.g., associated with a web page or domain comprising multiple web pages outside of the social networking system 130, and for associating web content with a node in the social networking system 130. Each node in the social graph may represent something that can act on and/or be acted upon by another node. Common examples of nodes include users, non-person entities, content items, groups, events, messages, concepts, and any other things that can be represented by an object in a social networking system. An edge between two nodes in the social graph represents a particular kind of connection between the two nodes, which may result from an action that was performed by one of the nodes on the other node.

The social networking system 130 may receive a request to associate the web content with a node in the social networking system 130. An external website 120, e.g., incorporates a tag into the markup language document for the web page(s) of the web content to claim ownership of the pages/domain in the context of the social networking system 130. In some cases, an entire domain or collection of web pages is associated with a unique identifier that associates the web pages with a node. Once established, the social networking system 130 tracks data associated with the node in the action log 230.

Data stored in the connection store 245, the user profile store 240 and the action log 230 allows the social networking system 120 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

For example, if a first user establishes a connection with a second user in the social networking system, user profiles of the first user and the second users from the user profile store 240 may act as nodes in the social graph. The connection between the first user and the second user stored by the connection store 245 is an edge between the nodes associated with the first user and the second user. Continuing this example, the second user man then send the first user a message within the social networking system 130, which is identified by the action logger 215 and stored in the action log 230. The stored action of sending the message is another edge between the two nodes in the social graph representing the first user and the second user. Additionally, the message itself may be identified from the action log 230 and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 240, where the attendance of the event is an edge between the nodes that may be retrieved from the action log 230. By generating and maintaining the social graph, the social networking system 130 includes data describing many different types of objects and the interactions and connections among those objects, providing a rich source of socially relevant information.

The analytics module 255 contains logic for generating analytics corresponding to user interactions with nodes. The analytics module 255 accesses tracked user actions information related to nodes, e.g., from the action log 230, and user demographic, behavioral, and other social data, e.g., from the user profile store 240, and produces analytics. The analytics include data corresponding to actions between users and nodes, as well as information about the users, data over time, etc. For example, actions by users related to nodes can include views, shares, comments, likes, etc., in addition, virality, engagement rate, re-share rate and depth, trends, and other metrics can be tracked over time. The demographic, behavioral, and other social data can include age, gender, location, primary language spoken, actions (posts, likes, comments, etc.) within the social networking system 130, activity levels, usage statistics, interests, affinities, etc. Using this data, the analytics module 255 has a rich pool of data corresponding to any given node, and thus can determine analytics such as likes, shares, feedback per share, re-share rate, feedback rate, etc. for a given period, such as a day or a week, or other short term or long term time periods. In addition, for domains with multiple web pages, the data can be aggregated and/or broken down by individual web pages. In addition, data can be shown according to demographics such as location, age, gender, etc. Analytics produced are stored in an analytics store 260.

Figure 6A:
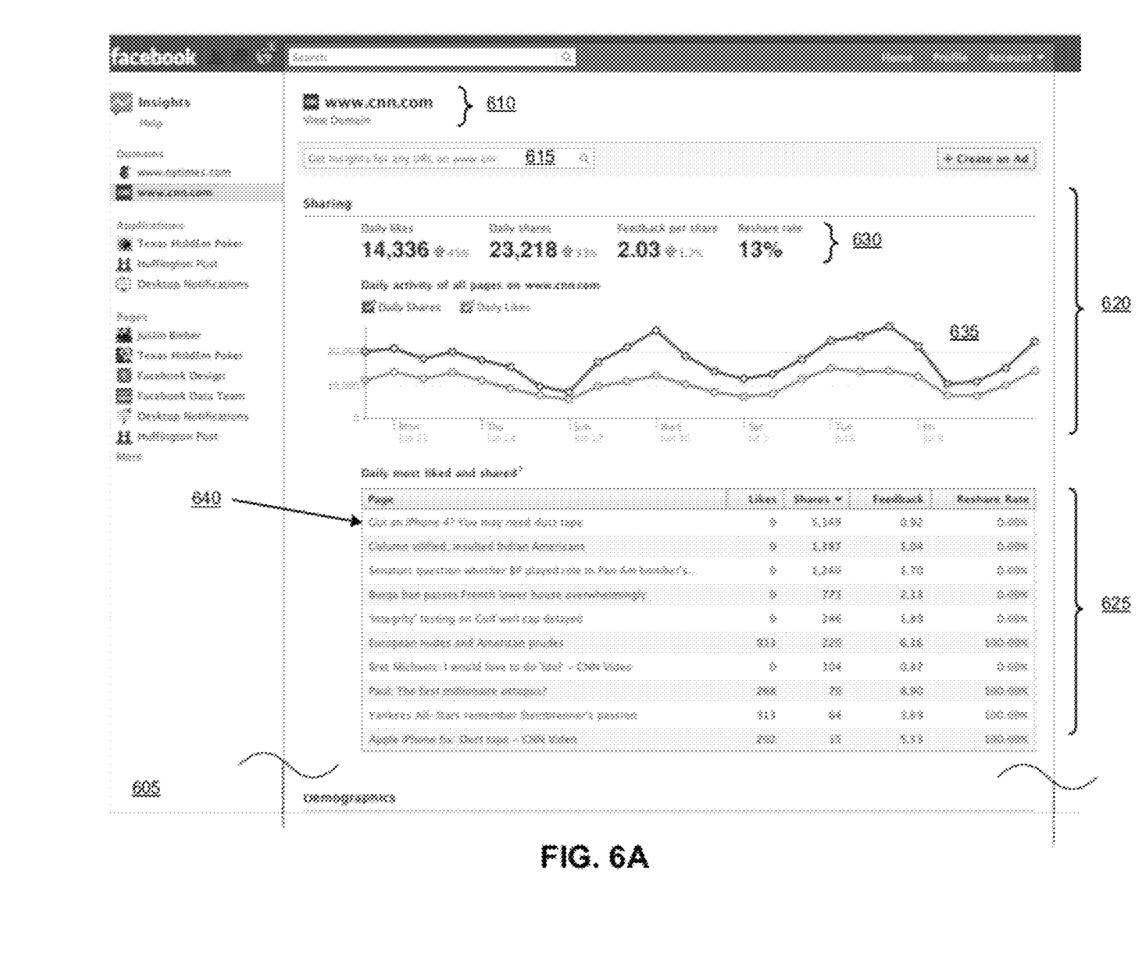
FIG. 6A-6B show one embodiment of a user interface for displaying analytics for user interactions with the web content.
Figure 6B:
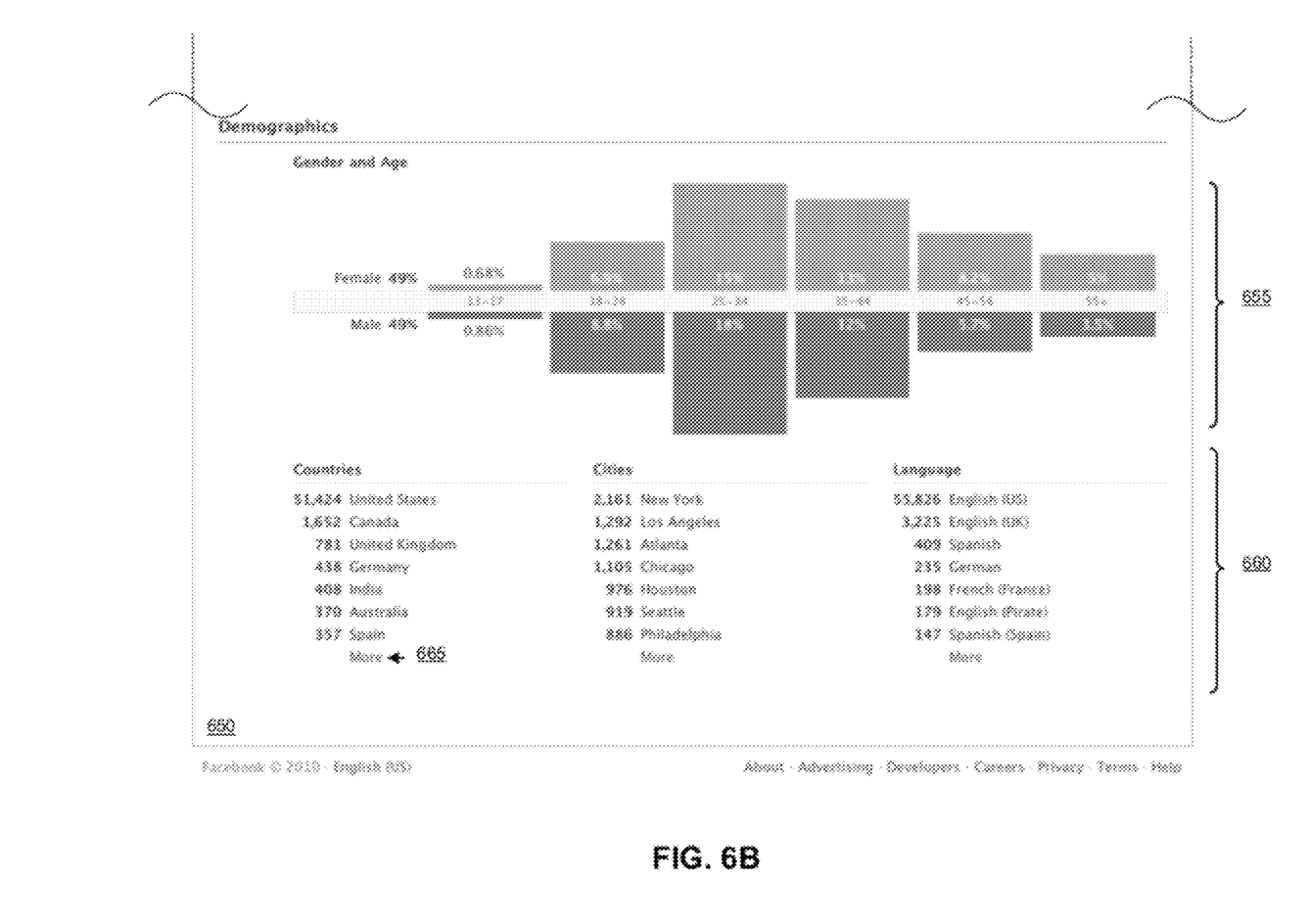

The user interface module 265 contains logic for providing the analytics information to the user associated with the website, e.g., for display in the form of a user interface. The display may show the data according to any of the analytics described above. An example of a user interface showing analytical data is shown in FIGS. 6A-6B.

Structure and Content of an External Web Page and Inclusion as a Node

Figure 3:
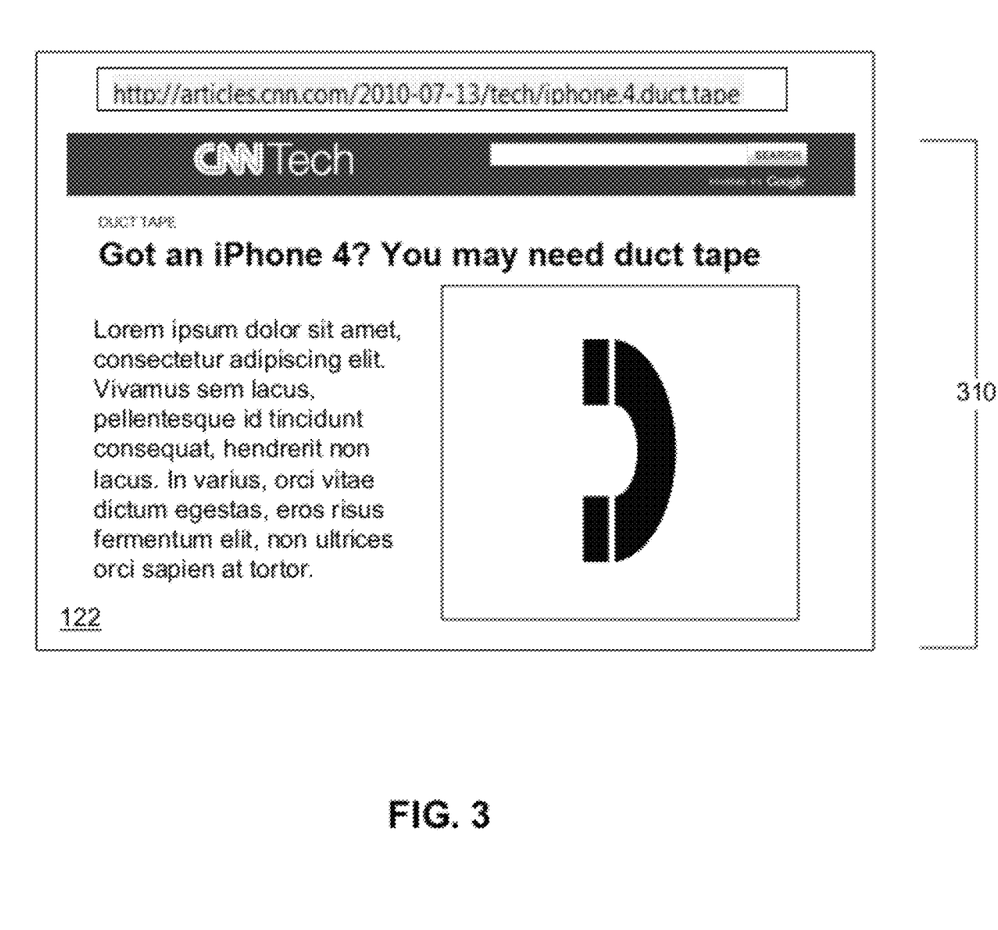
FIG. 3 is a web page of an external website.

FIG. 3 is one embodiment of a web page 122 of an external website 120. The web page 122 is outside of a social networking system 130 maintaining the social graph. The web page 122 includes content 310 such as text data, video data, image data or any other data for presentation using a browser application 122 operating on a user device 110. The web page 122 also includes one or more instructions describing formatting or presentation of the content 310. When a browser application 122 operating on a user device 110, executes the instructions included in the web page 122, the browser application 112 displays the identified content 310 using the format or presentation described by the web page 122.

In one embodiment, the web page 122 corresponds to a markup language document 116 that includes the content 310 and the instructions for formatting or presenting the content 310. In various embodiments, the markup language document 116 comprises a data file including extensible markup language (XML) data, extensible hypertext markup language (XHTML) data or other markup language data. In addition to the content 310 and instructions for formatting or presenting the content 310, the markup language document 116 comprising the web page 122 also includes one or more tags that include meta-information about a node in the social graph maintained by the social networking system associated with the web page 122. Initially, the social networking system 130 user associated with the web content may insert these tags into the markup language document to create the node within the social networking system 130. The tags may provide textual titles, labels, and/or descriptions about the node, as well as other information, such as a title, label, unique identifier, micro format, and/or descriptions about the node, as well as other information, such as the type of the node. The social networking system 130 retrieves the tags from the markup language document 116 and stores their information in connection with the node for the web page 122. The tags allow the social networking system 130 to create and define a node in a social graph based on the information contained within the web page. Because the web page 122 may be outside of a domain of the social networking system 130 and may be operated by an entity other than the social networking system 130 operator, the tags enable third parties to associate web content with nodes within the social networking system 130.

The tags within the markup language document 116 may include an administrator tag identifying one or more social networking system 130 users with the ability to create and/or maintain nodes associated with the web page 122. The administrator tag potentially allows users outside of the social networking system 130 to maintain nodes used by the social networking system 130. In one embodiment, the social networking system 130 provides a user interface to the user identifiers specified by the administrator tag, which facilitates access to the analytics associated with the node generated by the social networking system 130.

Figure 4:
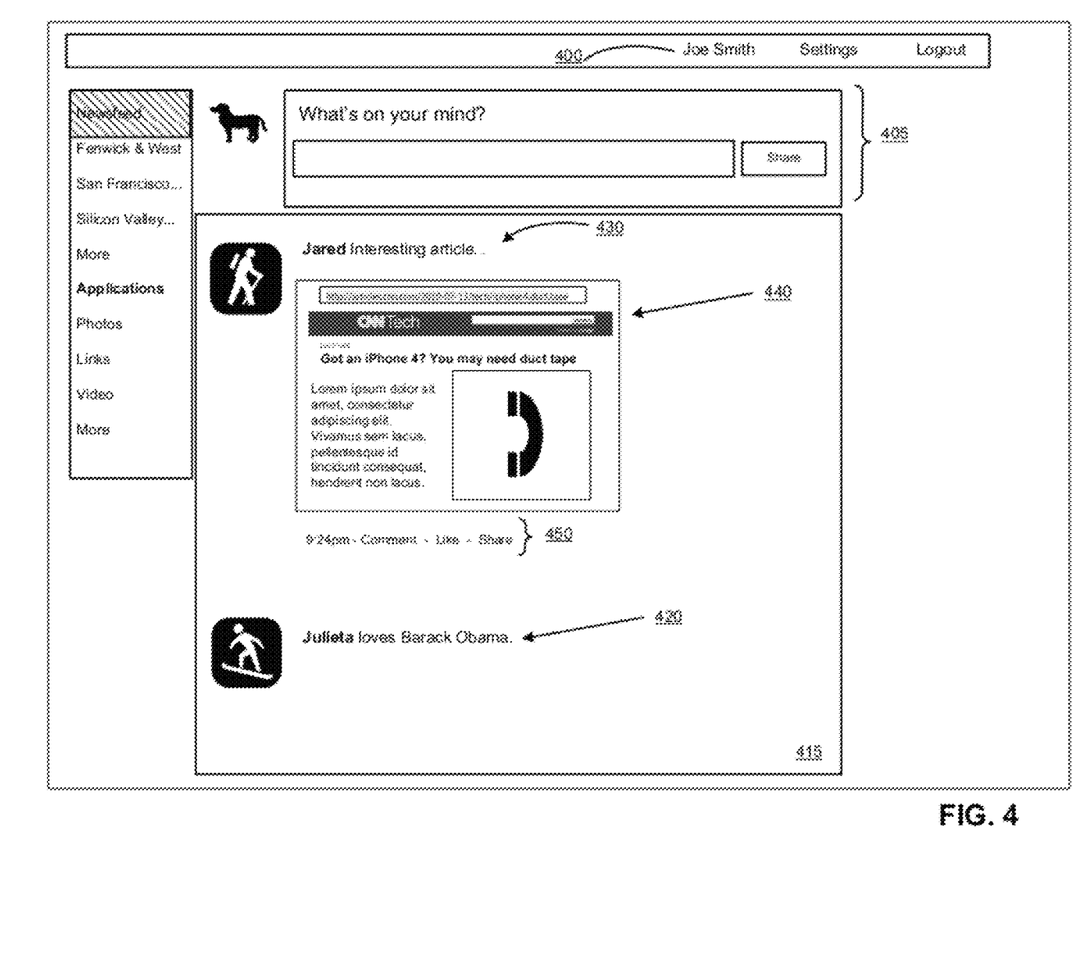
FIG. 4 is a screenshot of a social networking system page including web content according to one embodiment of the invention.

FIG. 4 is a screenshot of a social networking system 130 page including web content according to one embodiment of the invention. The title bar 400 indicates that "Joe Smith" is the user of the social networking service 130 associated with this particular web page. A posting interface 405 enables the user to upload and post content to one or more communication channels 415 in the social networking service for view by other users of the social networking service.

Within the posting interface 405, an input field and content submission button are displayed. The communication channel 415 comprises content items posted by users and entities on the social networking service. For example, a connection "Julieta" posted a status update 420 "loves Barrack Obama." Another connection "Jared" posted web content 440, e.g., as shown in FIG. 3, with an accompanying caption 430 "Interesting article . . . ." For example, Jared posted the web content 440 via a URL associated with the content 440 in the posting interface 405 on his own page or another page of the social networking system 130.

By posting the web content 440, user "Jared" created an edge between the node associated with the web content 440 and his user node, which edge is tracked by the social networking system 130. By clicking on the content 440, a user can view the article, and links 450 below the content 440 allow users to comment, "like," or share the web content 440. Each of these actions by another user also would constitute an edge between the web content 440 node and the user taking the action, which is tracked by the social networking system 130.

Figure 5:
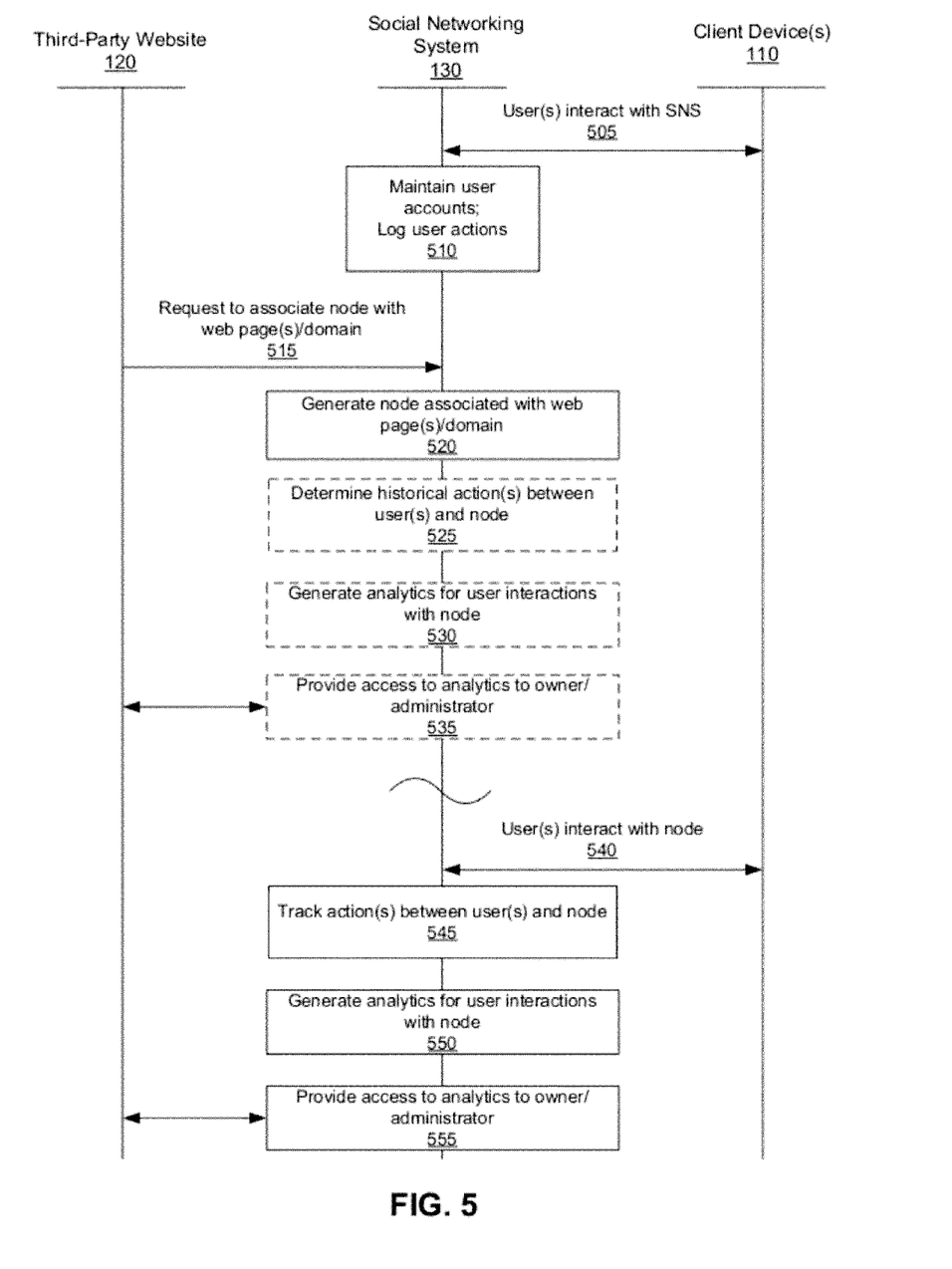
FIG. 5 is an interaction diagram of a process for tracking activity with a node associated with content external to a social networking system, in accordance with an embodiment of the invention.

Interaction with a Node Associated with External Web Content in a Social Networking System FIG. 5 is an interaction diagram of a process for tracking activity with a node associated with content external to a social networking system 130, in accordance with an embodiment of the invention. In the embodiment shown by FIG. 5, the external website 120 is separate from the social networking system 130. Initially, the social networking system 130 establishes user accounts and the users interact 505 with the social networking system 130, e.g., via user devices 110. The social networking system 130 maintains 510 user accounts and logs user actions within the social networking system 130.

An operator of one or more web pages 122 or of an external website 120 including the web page(s) 122 may request 515 to associate a node in the social networking system 130 with a web page 122, or with a domain associated with the web site 120. To do so, the external website 120 incorporates a tag 124 into the markup language document for the web page(s) 122, or for the domain including the pages 122, to claim ownership of the pages/domain in the context of the social networking system 130. The inserted tag, e.g., may specify the website operator's user identification for the social networking system 130. For example, the tag could be <owner>uid=454515</owner>, where 454515 is the user's identification. The social networking system 130 verifies the request by reading the tag and associating the user's identification with the website.

The social networking system 130 generates 520 a node associated with the web content external to the social networking system 130, which is a web page 122 or domain (comprising multiple web pages) outside of the social networking system 130. For example, the social networking system 130 generates a node from information in one or more tags 124 included in the markup language document(s) for the web content. After the node is generated, the web page 122 is included in the social graph maintained by the social networking system 130, effectively opening the social graph to administrators or others associated with the web content. The owner of the web content may be a user of the social networking system 130, an administrator of the domain associated with the web content, or both, according to various embodiments.

Once established, the social networking system 130 may provide analytics to the external website 120, or to the user associated with the web content, based on historical data. For example, because the social networking system 130 maintains 510 log files of user actions, the log may contain information about users' interactions with a web page even though it wasn't previously established as a node associated with a third party. Thus, when the node is generated 520, the social networking system 130 then can determine 525 historical actions between the users of the social networking system 130 and the node, generate 530 analytics from the historical data, and provide 535 access to the analytics to the user associated with the web content, e.g., a content owner, provider, or administrator.

Once established, users of the social networking system 130 continue to interact 540 with the node, now as a node, by interacting with the content associated with the node, e.g., via actions related to the web content. Such actions may include viewing the content, sharing the content (or re-sharing previously shared content), commenting on the content, "liking" or otherwise becoming a fan of or expressing interest in the content, etc. The social networking system 130 continues to track 545 the actions between users and the node, and can at any time generate 550 analytics from the actions and from demographic and behavioral data pertaining to the users, and provide 555 such analytics to the user associated with the web content. Web content 'owners' then can use the analytics for various purposes, e.g., to more effectively direct their advertising message to consumers.

FIG. 6A-6B show user interface portions that allow a user associated with web content, e.g., a social networking system 130 user acting as administrator of a domain or web page, to view information and analytics for user interactions with the web content. Certain demographic information is shown in the user interface embodiment shown in FIGS. 6A-6B by way of example, but any of the data associated with user interactions that is gathered by the social networking system 130 also may be shown according to other user interface configurations. Web content providers then can use the analytics for various purposes, e.g., to more effectively direct their advertising message to consumers.

FIG. 6A shows one embodiment of a first portion 605 of a user interface corresponding to web content for the cnn-.com domain 610. For example, the page may be accessible by a user of the social networking system 130, who may have administrator access to more than one domain, as shown. A URL entry field 615 allows for entry of any URL in the domain to show the corresponding analytics for that URL only. The user interface portion 605 also includes a sharing summary section 620 and a page-wise analytics summary 625.

The sharing summary section 620 provides summary totals 630 for daily likes, daily shares, feedback per share, and re-share rate for the entire domain 610. The sharing summary section 620 also provides a graphical representation 635 of daily shares and daily likes over a longer period of time. The daily share and daily likes check boxes may be selected or deselected to alter the display of the graphical representation 635.

The page-wise analytics summary 625 provides information about the most liked and shared pages within the displayed domain 610. For each page 640, the page name, number of likes, number of shares, feedback rate, and re-share rate are shown. Together the sharing summary section 620 and page-wise analytics summary 625 provide a snapshot of user interactions with the pages of the domain 610.

FIG. 6B shows one embodiment of a second portion 650 of a user interface corresponding to web content for the cnn.com domain 610. The portion 650 displays summary demographics for user interactions with the pages 640 of the domain 610, and includes a demographics bar graph 655 and demographics listings 660.

The demographics bar graph 655 in the example shown includes information about the gender and age of users interacting with the domain 610. The demographics listings 660 provides information about the location of users interacting with the domain and languages associated with the interactions. The demographics listings 660 also includes a control 665 to expand (or contract) the list.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
maintaining, by a social networking system, a user account for each of a plurality of users of the social networking system;
receiving, from a user of the plurality of users, a post including web content external to the social networking system, the external web content owned by a content owner external to the social networking system;
determining, by the social networking system, historical user actions related to the external web content;
generating, by the social networking system, a node in the social networking system corresponding to the external web content associated with the content owner, the node being associated with the determined historical user actions, the social networking system including a plurality of other nodes corresponding to content internal to the social networking system, the external web content node and the plurality of other nodes together comprising a social graph;
tracking, by the social networking system, user actions related to the external web content node, the tracked user actions comprising one or more communications between the users of the social networking system;
generating, by the social networking system, analytics corresponding to the historical user actions and the tracked user actions; and
providing, by the social networking system, the analytics to the content owner.

2. The method of claim 1, further comprising:
logging activities performed by the plurality of users of the social networking system in an action log;
wherein the historical user actions comprise user actions obtained from the action log.

3. The method of claim 1, wherein the external web content comprises a web page.

4. The method of claim 1, wherein the external web content comprises a domain comprising a plurality of web pages.

5. The method of claim 1, wherein the generated analytics include demographic information about the users associated with the historical user actions and the tracked user actions.

6. The method of claim 1, wherein the generated analytics include short term and long term analytics.

7. The method of claim 1, wherein generating, by the social networking system, the external web content node comprises:
obtaining at least one markup language document for the external web content;
identifying one or more tags in the at least one markup language document; and
using the identified tags to define the external web content node, the external web content node comprising a representation within the social networking system of the external web content.

8. The method of claim 1, wherein the one or more communications between the users of the social networking system comprise a user expressing an interest in an external website or entity related to the node.

9. The method of claim 1, wherein the one or more communications between the users of the social networking system comprise a user posting a comment to the social networking system that discusses a website or web page related to the external web content node.

10. The method of claim 1, wherein the one or more communications between the users of the social networking system comprise a user posting a link associated with a website related to the external web content node.

11. The method of claim 1, wherein the one or more communications between the users of the social networking system comprise a user attending an event related to the external web content node.

12. The method of claim 1, wherein the one or more communications between the users of the social networking system comprise a user interacting with a content object posted to the social networking system by another user.

13. The method of claim 1, wherein the one or more communications between the users of the social networking system comprise a user sharing a content object posted to the social networking system by another user.

14. The method of claim 1, wherein the one or more communications between the users of the social networking system comprise a user commenting on a content object posted to the social networking system by another user.

15. The method of claim 1, wherein providing, by the social networking system, the analytics to the content owner is based on the external web content node that was generated for the external web content, thereby opening the social graph to the content owner for measuring historical user actions and tracked user actions related to the external web content node that occur within the social networking system.

16. A method comprising:
maintaining, by a social networking system, a user account for each of a plurality of users of the social networking system;
receiving, from a user of the plurality of users, a post including web content external to the social networking system, the external web content owned by a content owner external to the social networking system;
determining, by the social networking system, historical user actions related to the external web content;
generating, by the social networking system, a node in the social networking system corresponding to the external web content associated with the content owner, the node being associated with the determined historical user actions, the social networking system including a plurality of other nodes corresponding to content internal to the social networking system, the external web content node and the plurality of other nodes together comprising a social graph;
tracking, by the social networking system, user actions within the social networking system, the tracked user actions comprising one or more communications between the users of the social networking system that relate to the external web content node;
generating, by the social networking system, analytics for the historical user actions and the tracked user actions, the analytics comprising a summary of the historical user actions and the tracked user actions; and
reporting, by the social networking system, the generated analytics to the content owner.

17. A method comprising:
maintaining, by a social networking system, a user account for each of a plurality of users of the social networking system;
receiving, from a user of the plurality of users, a post including web content external to the social networking system, the external web content owned by a content owner external to the social networking system;
determining, by the social networking system, historical user actions related to the external web content;
generating, by the social networking system, a node in the social networking system corresponding to the external web content associated with the content owner, the node being associated with the determined historical user actions, the social networking system including a plurality of other nodes corresponding to content internal to the social networking system, the external web content node and the plurality of other nodes together comprising a social graph;
tracking, by the social networking system, user actions, the tracked user actions related to the external web content node and comprising at least one activity of a type selected from a group comprising:
expressing an interest in an external website or entity related to the external web content node,
posting a comment to the social networking system that discusses a website or web page related to the external web content node,
posting a link associated with a website related to the external web content node,
attending an event related to the external web content node,
interacting with a content object related to the external web content node, the content object posted to the social networking system by another user,
sharing a content object related to the external web content node, the content object posted to the social networking system by another user,
commenting on a content object related to the external web content node, the content object posted to the social networking system by another user, and
any combination thereof; and
generating, by the social networking system, analytics for the historical user actions and the tracked user actions, the generated analytics comprising a report for the content owner of the historical user actions and the tracked user actions.

* * * * *